(12) United States Patent
Hecht

(10) Patent No.: US 6,340,118 B1
(45) Date of Patent: Jan. 22, 2002

(54) EXCLUSIVE OR CROSS-COUPLED FRAMING CODES FOR SELF-CLOCKING GLYPHS

(75) Inventor: David L. Hecht, Palo Alto, CA (US)

(73) Assignee: Xerox Corporation, Stamford, CT (US)

(*) Notice: Subject to any disclaimer, the term of this patent is extended or adjusted under 35 U.S.C. 154(b) by 0 days.

(21) Appl. No.: 09/464,934

(22) Filed: Dec. 16, 1999

(51) Int. Cl.$^7$ ................................................. G06K 19/06
(52) U.S. Cl. ......................................................... 235/494
(58) Field of Search ............................... 235/494, 462.1

(56) References Cited

U.S. PATENT DOCUMENTS

| | | | |
|---|---|---|---|
| 5,091,966 A | * | 2/1992 | Bloomberg et al. ......... 235/494 |
| 5,128,525 A | | 7/1992 | Stearns et al. |
| 5,168,147 A | * | 12/1992 | Bloomberg ................. 235/494 |
| 5,357,094 A | * | 10/1994 | Baldwin ..................... 235/494 |
| 5,449,896 A | | 9/1995 | Hecht et al. |
| 6,076,738 A | * | 6/2000 | Bloomberg et al. ......... 235/494 |
| 6,141,441 A | * | 10/2000 | Cass et al. .................. 235/494 |

FOREIGN PATENT DOCUMENTS

| | | | |
|---|---|---|---|
| JP | 168902 A | * | 7/1995 |
| WO | WO 00/73981 A1 | | 12/2000 |
| WO | WO 01/01670 A1 | | 1/2001 |

* cited by examiner

Primary Examiner—Karl D. Frech
Assistant Examiner—Allyson Sanders
(74) Attorney, Agent, or Firm—Finnegan Henderson Farabow Garrett & Dunner LLP

(57) ABSTRACT

A method is provided for encoding two-dimensional frame codes comprising the steps of establishing first and second line bit sequences, determining an exclusive OR (XOR) logic value of the first and second code lines to obtain a two-dimensional matrix of XOR logic values and determining the two-dimensional frame codes using the matrix of XOR logic values.

4 Claims, 5 Drawing Sheets

XOR FRAME CODE ARRAY A=10101010...;B=01010101...,C=DATA

*FIG. 5*

EXCLUSIVE OR CROSS-COUPLED FRAMING CODES FOR SELF-CLOCKING GLYPHS

CROSS REFERENCES

This application is related to concurrently filed, commonly assigned U.S. patent application Ser. No. 09/465,990, entitled "A Machine-Readable Record With a Two-Dimensional Lattice of Synchronization Code Interleaved With Data Code," by David L. Hecht.

FIELD OF THE INVENTION

This invention relates to framing formats for self-clocking glyph codes and, more particularly, to framing formats that include a lattice infrastructure of reference glyphs for encoding overhead information combined with a matrix of data glyphs.

BACKGROUND OF THE INVENTION

As is known, self-clocking glyph codes are suitable for embedding machine readable data in images of various descriptions, but they are especially advantageous for applications that require or benefit from having the machine readable data embedded in the images in a visually nonobstructive or aesthetically pleasing way. Specifically, to provide a visually homogeneous glyph pattern (a glyph pattern in which the glyphs are substantially indistinguishable from each other when viewed by the naked eye under normal lighting conditions) all of the glyphs of the self-clocking glyph pattern typically are defined by symbols from the same symbol set, such as slash-like symbols that are tilted from vertical at approximately ±45° to encode binary "0's" and "1's," respectively. More generally, however, a "glyph" is any character that has at least two graphical states for encoding at least two logic states ("1" and "0") of a single bit.

A self-clocking glyph pattern comprises data glyphs that encode information of user interest and reference glyphs that encode overhead information, such as spatial synchronization, address information, labeling information and authentication. This overhead information facilitates the reading and/or interpretation of the data glyphs. Typically, data glyphs are arranged in a two-dimensional lattice. Reference glyphs may also take on a two-dimensional lattice configuration. For example, U.S. Pat. No. 5,449,895, entitled, "Explicit Synchronization For Self-Clocking Glyph Codes," gives a number of examples of data glyphs, reference glyphs, and lattice structures.

In general, many of the applications for two-dimensional reference glyphs codes interweaved with data glyph codes involve synchronization of glyph codes. U.S. Pat. No. 5,449,895 for example, deals with facilitating robust synchronization of glyph codes. This patent also cites useful background references on self-clocking codes and related applications. The contents of U.S. Pat. No. 5,449,895 is hereby expressly incorporated herein by reference.

U.S. Pat. No. 5,576,532, entitled, "Interleaved and Interlaced Sync Codes and Address Codes for Self-clocking Glyph Codes," describes self-clocking reference glyphs interleaved or interlaced in two dimensions with data glyphs to facilitate the partitioning and correlation of data embedded in the data glyph codes. Specifically, with respect to FIG. 4 there is disclosed the mapping of interwoven two-dimensional interleaved reference glyph codes with data glyphs into a self-clocking glyph code pattern.

Thus, the '531 patent discloses interleaved self-clocking glyph codes to facilitate the partitioning and/or correlation of data subsets based on local spatial relations of reference glyphs in a data glyph code pattern. This approach can improve the interpretation of the logical relationship among data sets and the data in each data set. Both one-dimensional and two-dimensional linear subarray interleaving is described. The contents of U.S. Pat. No. 5,576,532 is hereby expressly incorporated herein by reference.

The present invention builds on and extends the techniques disclosed in U.S. Pat. Nos. 5,449,895 and 5,576,532.

SUMMARY OF THE INVENTION

Consistent with the principles of the present invention, a method is provided for encoding two-dimensional framing codes, comprising the steps of: establishing first and second code line bit sequences; determining the exclusive OR (XOR) logic value of the first and second code lines to obtain a two-dimensional matrix of XOR logic values; and determining the two-dimensional frame codes using that matrix of XOR logic values.

BRIEF DESCRIPTION OF THE DRAWINGS

Still further features and advantages of this invention will become apparent when the following detailed description is read in conjunction with the attached drawings in which:

FIG. 2 illustrates the content of a matrix of EXCLUSIVE OR logic values;

FIG. 3 illustrates an interleaved mapping of a frame code developed utilizing EXCLUSIVE OR logic values with a data code;

FIG. 4 illustrates an alternative embodiment utilizing frame code developed from EXCLUSIVE OR logic values; and FIG. 5 illustrates a still further alternative embodiment using a short sequence of repetitive values to develop the logic values.

DETAILED DESCRIPTION OF THE ILLUSTRATED EMBODIMENTS

Figure 1:
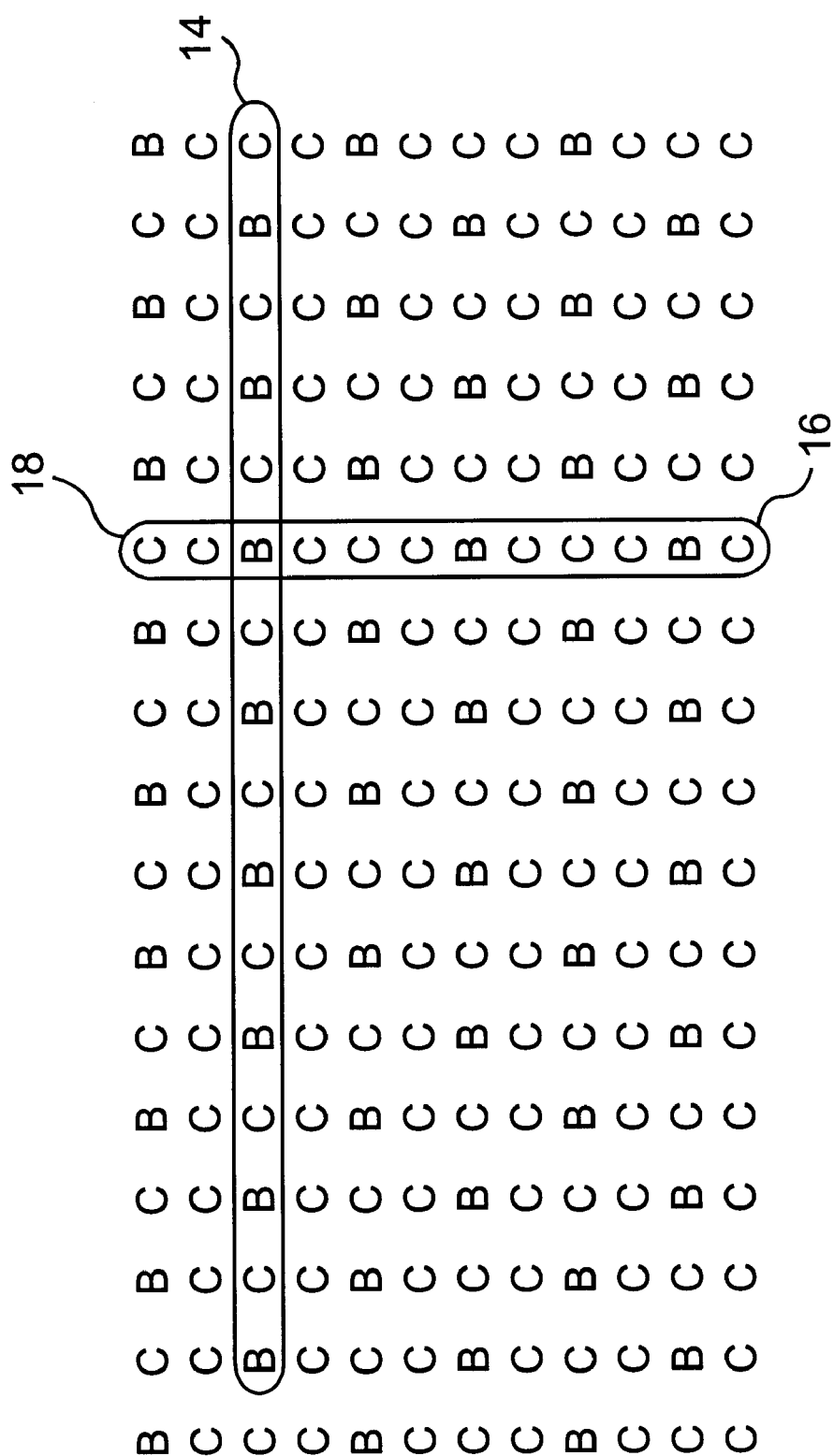
FIG. 1 illustrates the positions of an EXCLUSIVE OR logic value matrix.
Figure 2:
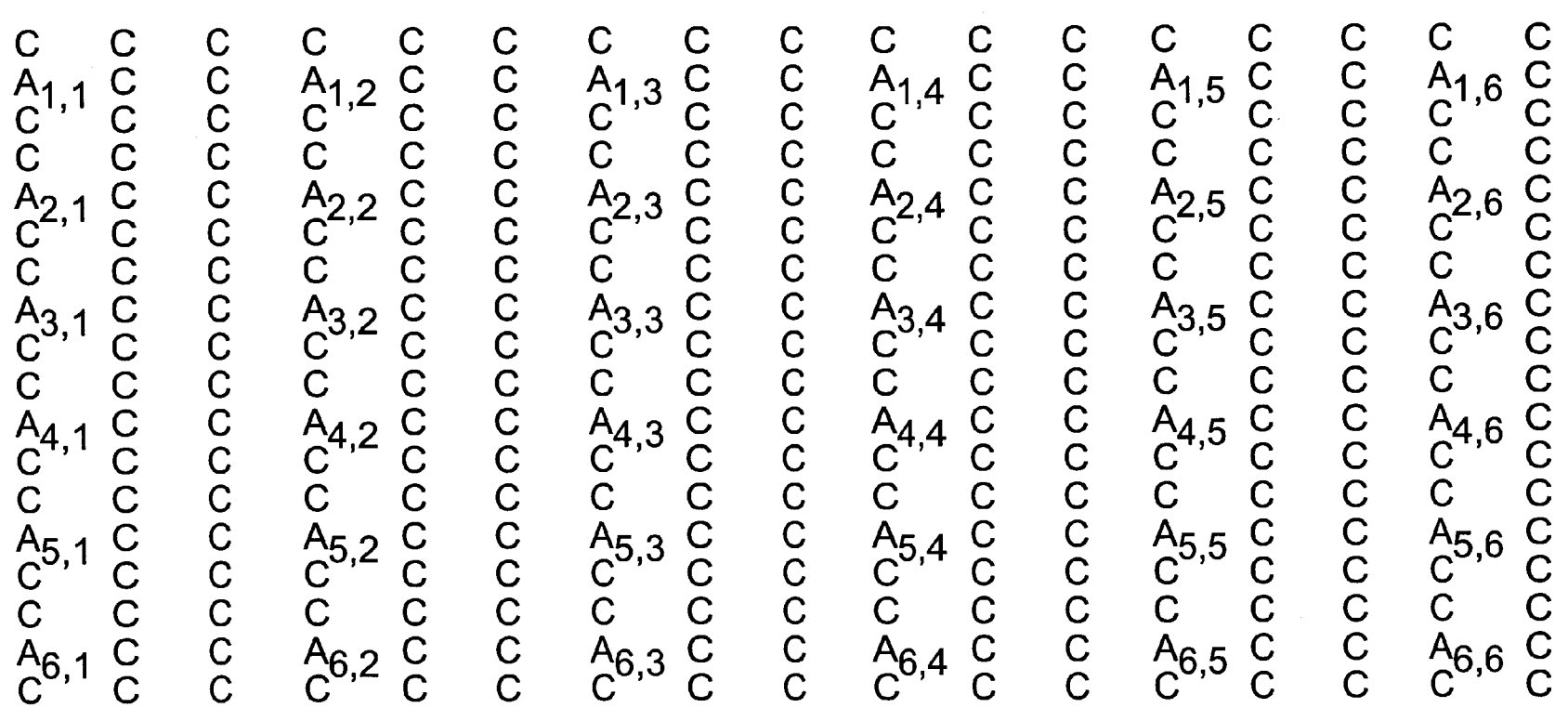
Figure 3:
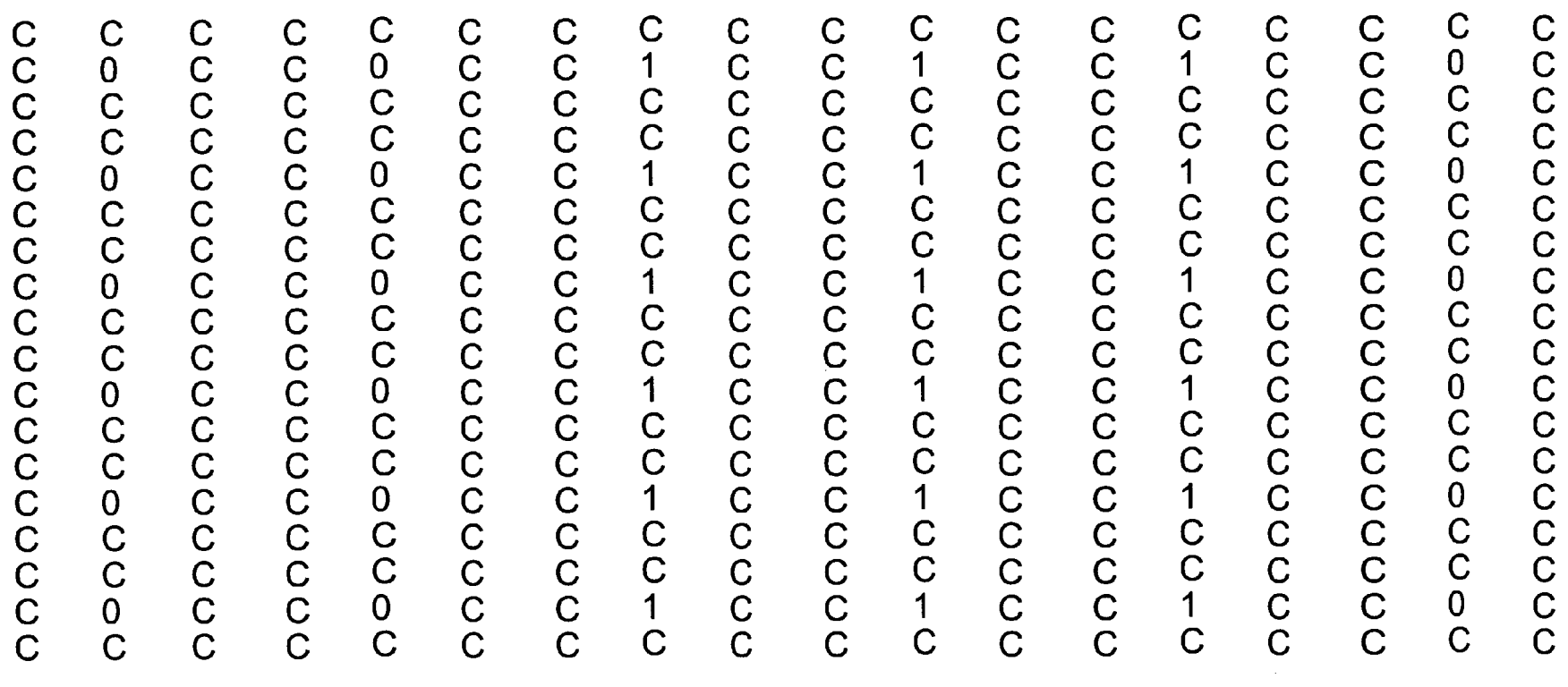

FIGS. 1, 2, and 3 demonstrate an EXCLUSIVE OR methodology for developing cross-coupled codes. Consistent with the principle of this invention, two-dimensional framing codes of self-clocking glyph codes are structured to permit intersecting sync code lines to be encoded with independent synchronization and addressing code information, while intrinsically managing conflicts of the bit values for glyphs at those intersections. This technique thus permits the utilization of framing code subarrays of any size, independent of the frame code. This method encodes all glyphs of a frame code with values determined by a logic EXCLUSIVE OR ("XOR") of two code lines. Thus, an entire code line of glyphs is inverted with respect to an input code when the corresponding code for that line in the other input code has a value of "1." Using this technique, parallel frame lines should have the same code with equivalent logical positions (code phase) at every intersection.

As one illustrative example, a first code line bit sequence A may comprise values 011011011 . . . and be used for a vertical direction code line bit sequence. A second code line bit sequence B may have the values 0011101001 . . . and be used for a horizontal code line bit sequence. When first bit line sequence A is EXCLUSIVE OR'd with the second bit line sequence B, a matrix $D_{I,J}(i,j)$ is formed whereby $D_{I,J}(i,j)$ equals $A_{j(J)} \oplus B_{i(I)}$. Thus, the first step in implementing the subject invention involves the establishment of first and second code line bit sequences such as, by way of example, code line bit sequences A and B. The second step is to determine the EXCLUSIVE OR (XOR) logic value of the first and second code lines to obtain a two-dimensional matrix of XOR logic values. One such two-dimensional matrix is illustrated in FIG. 1 as showing at the various vertical and horizontal locations a logic value $D_{I,J}$ calculated as indicated above. In FIG. 2, the specific value for each location $D_{I,J}$ is given for the A and B code line bit sequences identified above, namely where A equals 011011011 . . . and B equals 0011101001 . . . . Those skilled in the art should understand that, given the above example, at the intersection of a row and column code for a given parallel line, the resultant logic value is inverted if the corresponding code for that line in the second code bit line sequence has a value of "1." The inherent result of the EXCLUSIVE OR operation thus intrinsically manages conflicts for glyphs at the intersections of the resultant matrix of XOR logic values.

For decoding, all that is necessary is to detect the bits that have been subject to inversion. For synchronization codes, this is typically readily accomplished by comparing a specific $D_{I,J}$ value with the corresponding first and second code line bit sequence values. A typical method for decoding synchronization codes is to correlate the read bit pattern against the predefined sync pattern to find a sharp maximum. If all the read bits are flipped, the correlation will be a sharp negative maximum. Then a code A can be read from any of the columns from the reference lattice and the code B can be read from any of the rows of the reference lattice. Reading a row and a column can provide the XY address of the intersection glyph.

This XOR encoding can be applied to any rectangular or any parallelogram lattice structure, independent of interlace of another glyph pattern array.

One example of EXCLUSIVE OR framing is illustrated in FIG. 3, wherein an interleave methodology is disclosed such that the framing codes of FIG. 2 are now interleaved with data glyphs C. In the embodiment of FIG. 3, a logic value from the matrix of FIG. 2 has replaced each $M_a$th data glyph C along the X direction and a logic value from the matrix of FIG. 2 has replaced each $M_a$th data glyph C along the Y direction, as has been disclosed in co-pending U.S. application, Ser. No. 09/465,990, the contents of which is hereby expressly incorporated herein by reference. In the FIG. 3 embodiment, $M_a$ equals 3 and $M_b$ equals 3. As a general rule, $M_a$ and $M_b$ must each be integers greater than 1, but they need not equal each other.

Thus, there is provided a sync code comprising a two-dimensional lattice. A first code sequence, for example 001110, extends horizontally in a first, horizontal line direction 30 while, for example, a second code sequence 100100 extends in a second, vertical line direction of the lattice. As a consequence of the present technique, there is multiple utility of glyphs, such as glyph 34 of the sync code, as a common part of both the first sequence in row 30 and the second sequence in column 32.

The key to the utility of the XOR method of the present invention is that the framing code sequences A and B to be XOR'd need not have a predefined length to avoid intrinsic conflicts in the resultant framing code matrix. For decoding, all that is necessary is the identification of the inverted bits. Once those bits have been reverted to their original condition, the A code can be read from any of the columns of the framing code lattice and the B code can be read from any of the rows of the framing code lattice.

Figure 4:
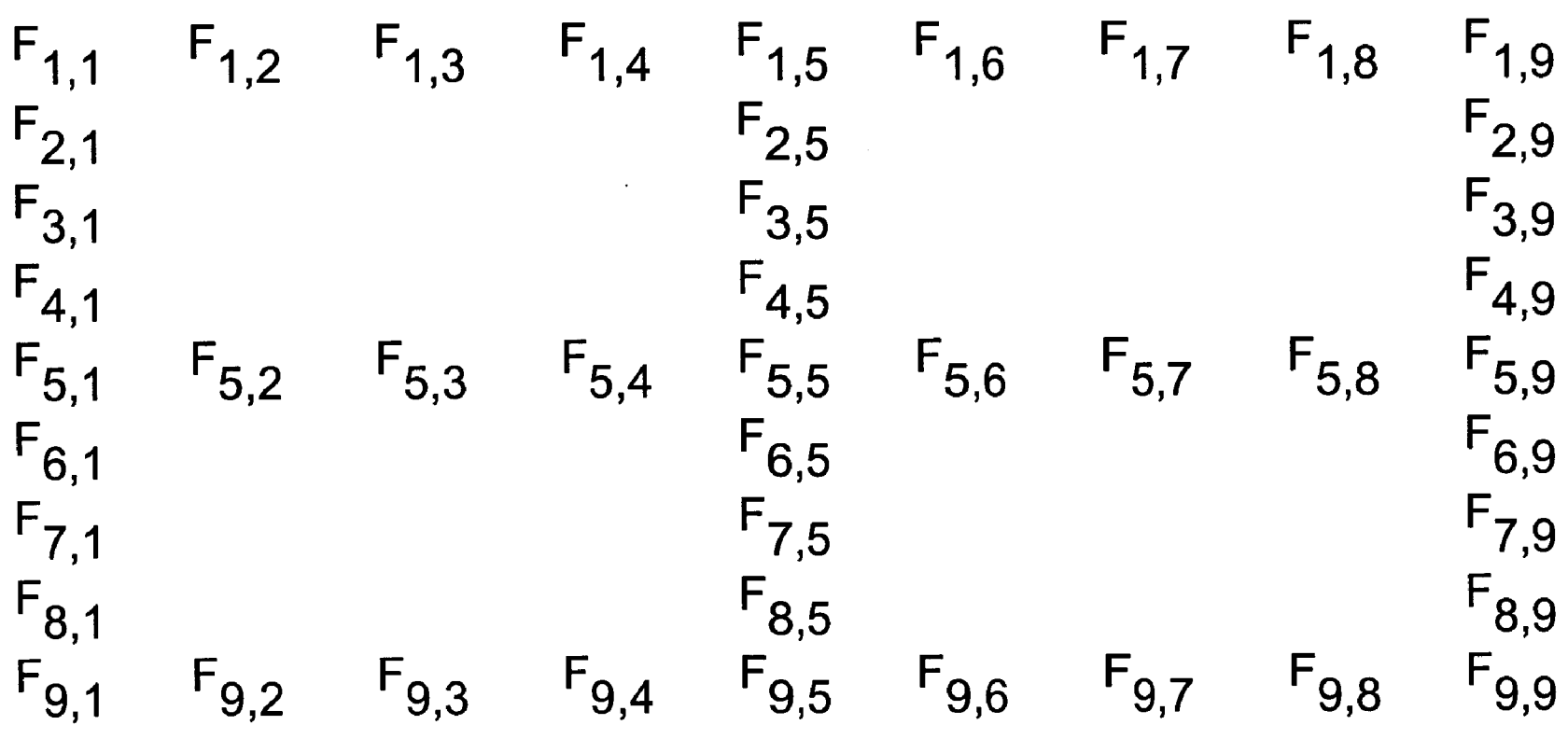

The use of XOR cross-coupled codes need not be restricted to an interleave arrangement of the type disclosed above. For example, as shown in FIG. 4, a framing code may be defined in an array $F_{I,J}$ equal to $A_{j(J)} \oplus B_{I(I)}$. In this case, subarrays of the resultant XOR logic value matrix are discarded and their vacant positions are utilized by encoded data glyphs C (not shown). Thus, the subarrays are completely ordered by a framing lattice that has automatic resolution of conflicts at points of intersection. As shown in FIG. 4, only values corresponding to the indices of glyphs on a frame code line are considered. No frame glyphs exist in intervening positions where other glyphs, graphics or space may be provided, hence allowing the remaining glyphs to act as a "frame." In general, data glyphs may be employed inside the frames that could have the same or different centering patterns and that could have the same or different glyph shape choices.

Figure 5:
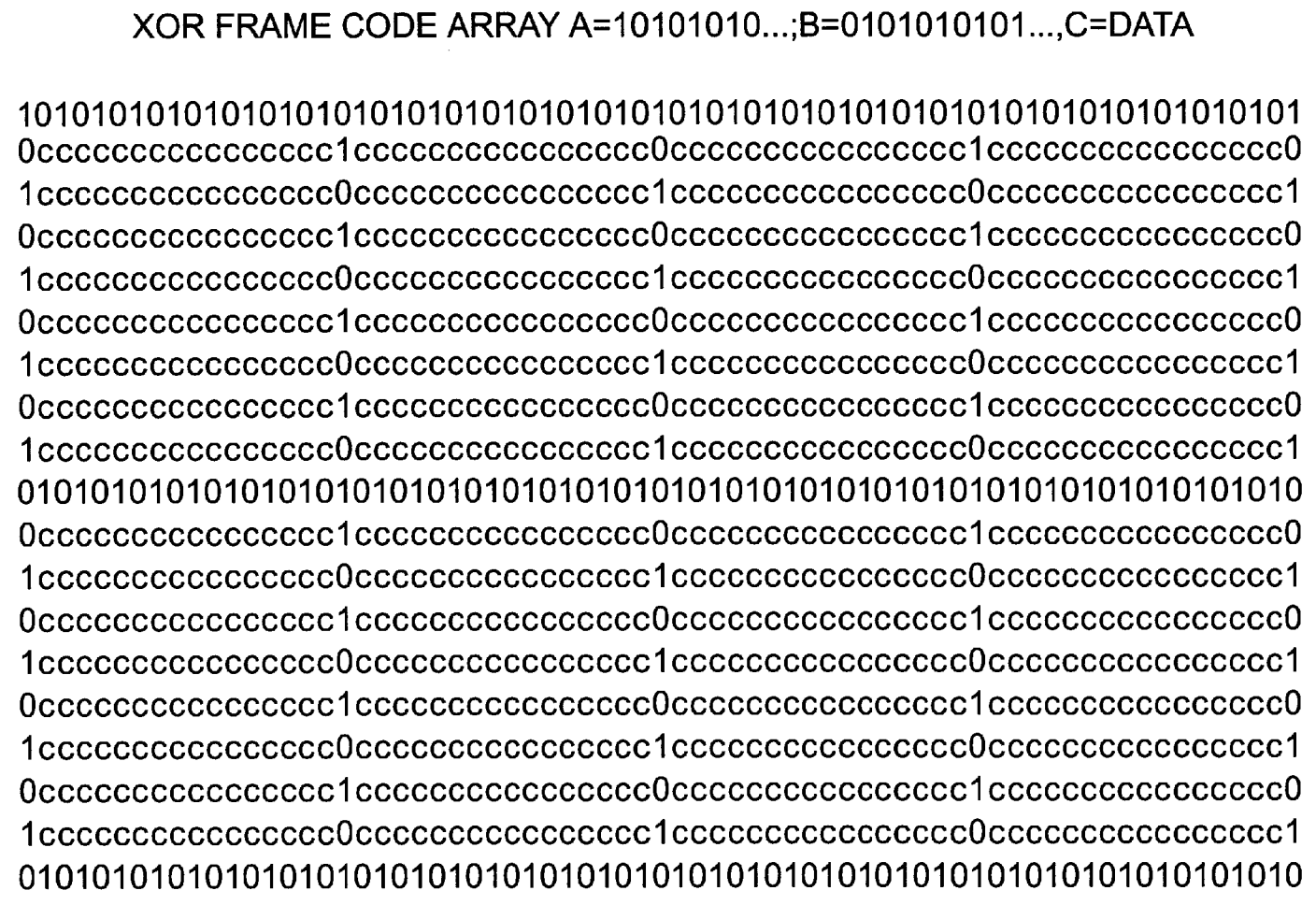

FIG. 5 illustrates an XOR frame code for an array of codes $A_1$ equal to 101010 . . . and $B_1$ equals to 010101 . . . . An EXCLUSIVE OR framing technique of the type disclosed above was implemented to form a rectangular array framing code that encloses 16 by 8 glyphs of a subarray illustrated by data glyphs "e" in FIG. 5. Although the period of the block structure shown in FIG. 5 is 17 and the period of the sync code is 2, there is no interference of the various frame codes at points of intersection. In this case of so simple a sync code, there is little addressing information present, except the important information of the identity of the frame outlining the glyphs of data interest. Thus, bit inversion is not important in the decoding process in such an embodiment.

More generally, codes A and B could be longer shift-registered codes or shorter shift registered codes interleaved with short sync acquisition codes. For example, A could be a nine-bit shift register sequence interleaved with a sync acquisition code 01110111 . . . while B could be a nine-bit shift register sequence interleaved with a distinguished sync acquisition code 011011011 . . . . These can be coded into an arbitrary framing of a large rectangular array of glyphs, perhaps 1.5 by 17 inches, providing unique addressing and the capacity for random access reading.

What is claimed:

1. A method for encoding two-dimensional framing codes, comprising the steps of:
    establishing first and second code line bit sequences;
    determining the exclusive OR (XOR) logic values of said first and second code lines to obtain a two-dimensional matrix of XOR logic values; and
    determining said two-dimensional frame codes using said matrix of XOR logic values.

2. The method of claim 1 wherein said framing codes are self-clocking glyph codes.

3. The method of claim 1 further including the step of writing said two-dimensional frame codes on a record medium.

4. The method of claim 1 wherein said code lines are written with 0 and 1 values and wherein, as a result, the XOR logic values of the first code line are all inverted for a given parallel line of the matrix if the corresponding code for that line in the second code line has a value of 1.

* * * * *